(No Model.)
D'E. S. COVERT & J. K. PUMPELLY.
SECONDARY BATTERY.
No. 416,573.     Patented Dec. 3, 1889.
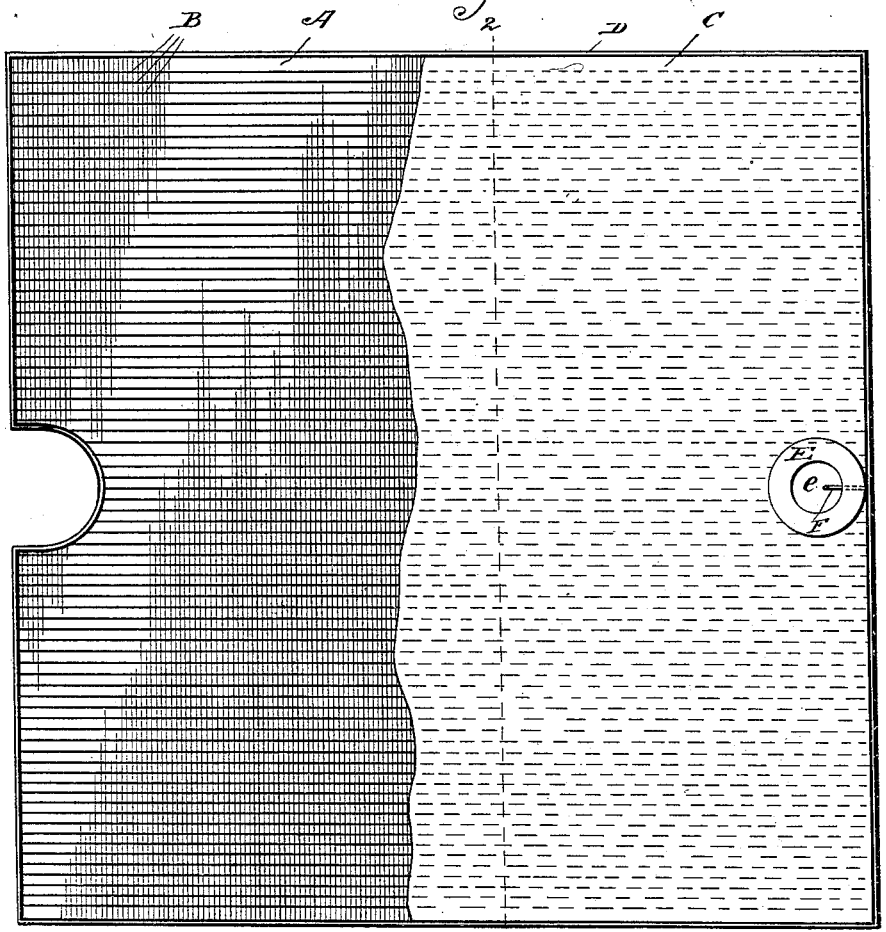
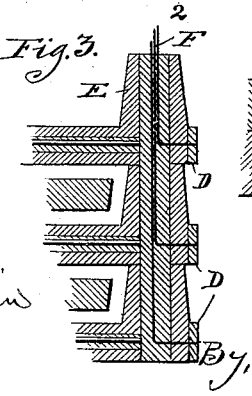
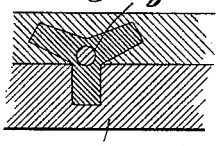
Witnesses
F. F. Mann,
Frederick F. Goodwin
Inventor,
D'Estaing S. Covert
James K. Pumpelly
By Offield & Towle Attys

UNITED STATES PATENT OFFICE.

D'ESTAING S. COVERT AND JAMES K. PUMPELLY, OF CHICAGO, ILLINOIS; SAID PUMPELLY ASSIGNOR TO SAID COVERT.

SECONDARY BATTERY.

SPECIFICATION forming part of Letters Patent No. 416,573, dated December 3, 1889.

Application filed March 15, 1889. Serial No. 303,418. (No model.)

*To all whom it may concern:*

Be it known that we, D'ESTAING S. COVERT and JAMES K. PUMPELLY, of Chicago, Illinois, have invented certain new and useful Improvements in Storage-Batteries, of which the following is a specification.

Our invention relates to improvements in the electrodes of storage or secondary batteries in which the stored electricity is derived from a primary battery, dynamo, or other source outside of itself. In the first batteries of this class electrodes of platinum were used. In 1860 Gaston Planté used electrodes made of two sheets of lead, not in contact, in a bath of dilute sulphuric acid, which, by repeated charges in alternate directions, became coated on the anode or positive plate with dioxide of lead, and the cathode or negative plates assumed a spongy state. By further charging from a dynamo the anode-plate became peroxidized and the cathode-plate was deoxidized by the liberated hydrogen. In this condition they were able to retain or store a charge of electricity for a long time.

In 1881 Faure improved and shortened the process by coating the lead plates with already-prepared oxide of lead, which on the anode-plate was, by charging, converted into a peroxide of lead, and on the cathode-plate was first reduced to a lower oxide and then to spongy lead. Later inventors still further improved the process by using plates of lead or alloys of lead having spaces or perforations for the purpose of retaining better in position the active material. The passing of a strong current of electricity through the electrodes, either in charging or discharging them, has a tendency to heat and expand them and by bending or buckling them to break the contact between them and the oxides or active material. This causes the latter to crumble and fall out of place, thus reducing the amount of efficient surface, and also sulphating of the plates, and in case two plates in bending touch each other a short circuit is produced.

On account of the great expense of platinum, it is almost universal practice to use plates of lead or lead alloys in some form as the support of the active material, and in order to prevent the difficulties above referred to a great many devices have been proposed, none of which, we believe, have been entirely efficient.

Our improvement consists in the use of asbestus or any other fibrous absorbent non-metallic and inoxidizable material as a support for the oxides or active material. As we prefer the use of asbestus, we will take that as an example for illustration. This is an absorbent mineral, practically inoxidizable in its nature, through which the electrolytic liquid passes readily, and it is not affected by the difficulties heretofore referred to. We prefer to use it in the form of a loosely-woven cloth cut to the size of the required electrode. On the surface of this we place a mold constructed with narrow longitudinal channels across the face of the asbestus plate and around the rim of it, and through this we pour melted lead or lead alloys, which, opposite the channels, enter the pores of the fabric and become integral with it, forming also raised ridges upon the surface. These lead ducts or conductors are so constructed as to all join together at the lug upon one side of the plate and serve as electrical conductors.

In another construction we place between the mold and the plate a frame-work of small rods of copper or other suitable conductor coated with any metal not affected by the acid solution and so arranged as to correspond with the channels in the mold, and then pour the melted lead or lead alloy through the mold, which covers the above frame-work, and also penetrates the fabric of the asbestus plate, as before described. This makes a better conducting system than lead or lead alloys alone. The paste of oxide of lead is then placed upon the plate, filling all the interstices between the metals, and is pressed until a portion penetrates the asbestus plate and becomes integral with it. We prefer to prepare only one side of the plate in the manner above described and to place the plates in the cell horizontally, as in this way any particles of oxides which by accident might be broken or displaced could not fall upon the next plate below, and also, if by any means a plate should be so bent as to come in contact with the next plate, as the active surface of one plate could only come in contact with the non-conducting asbestus, it could not short-circuit the cell; but our invention includes an electrode in which the asbestus is used as a support for the active material, said plate being treated on both sides in the manner herein described for treating one side. The asbestus being very porous and absorbent, the electrolyte passes freely through it, and thus comes in contact with the active material on both sides, giving the advantage of two surfaces. In either form the conductors of the electrodes are all so connected at the lug on the side of the plate that they may be easily connected with the common conductor uniting all the plates of each class.

Our invention also includes, as an improvement in storage-batteries, the extension of the system of lead-covered copper wire through all the lugs of the positive or negative plates and enveloping them in lead or lead alloys, whereby to connect all the plates of one kind together at suitable distances apart and to continue together above the electrolyte in such a way that the electrodes may be easily connected with those of adjoining cells or with a dynamo or other source of electricity. These lugs are so made as to close firmly against adjoining plates, making tight and acid-proof connections.

In the accompanying drawings, Figure 1 is a plan view of an electrode, part of its surface being removed to show conductors in the form of threads or thin bars penetrating the asbestus sheet. Fig. 2 is a cross-section on line 2 2, Fig. 1, looking in the direction indicated by the arrow. Fig. 3 is a detail in vertical section through the lugs of a series of plates in position and through fragmentary portions of the said plates. Fig. 4 is a detail showing in cross-section that form of construction in which the metallic conductor comprises a core of high-conducting metal with an envelope of non-oxidizable metal.

In said drawings, A represents a sheet of asbestus, which forms the support for the active material.

B represents conductors, which may be of lead and formed in the manner above described; or copper wires $b$, Fig. 4, may be employed.

C represents the active material.

D is the metallic frame which receives the current from the conductors B or $b$.

E is a lug, one of which is provided for each plate and so disposed as to lie in the same vertical plane when the plates are in position. The lugs E have the hollows $e$, and the conductors $b$ or wires F extend from the metallic frame D and are carried up within the hollow of the lugs, said wires being coated with a non-oxidizable metal.

We do not intend, of course, to limit our invention to the particular manner of constructing the conductors and securing them to the asbestus support, nor to the other details of construction herein shown and described, as our invention, broadly stated, includes any method wherein a fibrous or absorbent non-metallic material is used as a support for the active material and provided with suitable conductors for receiving or carrying away the electricity.

A desirable feature of our invention is the use of a support of less weight than the common lead plates, particularly when used in a portable battery.

We claim—

1. An electrode or plate for secondary batteries, comprising a support for the active material, composed of a fibrous or absorbent non-metallic material, as asbestus, and having cast upon one of its surfaces conductors composed of lead or lead alloys, with interstices between said conductors, in which the active material is placed, substantially as described.

2. An electrode or plate for secondary batteries, comprising a support for the active material, composed of a fibrous or absorbent non-metallic material and having secured upon or incorporated with it conductors in contact with the active material, said conductors comprising a core of high-conducting metal and an envelope or coating of non-oxidizable metal, substantially as described.

3. In a storage-battery, the combination, with a series of plates having the support for the active material composed of a fibrous or absorbent non-metallic material, as asbestus, having metallic conductors secured upon or incorporated therewith, and active material in contact with the conductors, said conductors having their terminals united at one point, and said plates having also hollow lugs adapted, when the plates are placed in position in the battery, to form a continuous opening, through which the said terminals are extended, whereby to connect all the plates of the series, substantially as described.

D'ESTAING S. COVERT.
JAMES K. PUMPELLY.

Witnesses:
FREDERICK C. GOODWIN,
T. D. BUTLER.